(12) United States Patent
Deng

(10) Patent No.: US 12,139,018 B2
(45) Date of Patent: Nov. 12, 2024

(54) ALL-TERRAIN VEHICLE AND HYBRID POWER ASSEMBLY THEREOF

(71) Applicant: SEGWAY TECHNOLOGY CO., LTD., Changzhou (CN)

(72) Inventor: Zhengchang Deng, Changzhou (CN)

(73) Assignee: SEGWAY TECHNOLOGY CO., LTD. (CN)

( * ) Notice: Subject to any disclaimer, the term of this patent is extended or adjusted under 35 U.S.C. 154(b) by 324 days.

(21) Appl. No.: 17/730,383

(22) Filed: Apr. 27, 2022

(65) Prior Publication Data

US 2022/0250461 A1   Aug. 11, 2022

Related U.S. Application Data

(63) Continuation of application No. PCT/CN2020/126604, filed on Nov. 4, 2020.

(30) Foreign Application Priority Data

Nov. 4, 2019 (CN) .......................... 201911067893.0

(51) Int. Cl.
*B60K 6/48* (2007.10)
*B60K 6/405* (2007.10)
*B60K 6/543* (2007.10)

(52) U.S. Cl.
CPC ............... *B60K 6/48* (2013.01); *B60K 6/405* (2013.01); *B60K 6/543* (2013.01); *B60K 2006/4825* (2013.01); *B60Y 2200/20* (2013.01)

(58) Field of Classification Search
CPC .. B60K 6/46; B60K 6/405; B60K 2006/4825; B60Y 2200/20
See application file for complete search history.

(56) References Cited

U.S. PATENT DOCUMENTS

| | | | |
|---|---|---|---|
| 7,239,032 B1* | 7/2007 | Wilson | F02N 11/04 290/31 |
| 10,677,211 B1* | 6/2020 | Yohannes | F02P 7/07 |
| 2006/0027192 A1* | 2/2006 | Tsukada | F01P 5/06 123/41.7 |
| 2008/0173170 A1* | 7/2008 | Zauner | F02F 7/0068 92/261 |

(Continued)

FOREIGN PATENT DOCUMENTS

| | | |
|---|---|---|
| CN | 106741563 A | 5/2017 |
| CN | 109017262 A | 12/2018 |

(Continued)

*Primary Examiner* — Brian L Swenson
(74) *Attorney, Agent, or Firm* — Emerson, Thomson & Bennett, LLC; Roger D. Emerson; Matt J. Wilson

(57) ABSTRACT

A hybrid power assembly and an all-terrain vehicle are provided. The hybrid power assembly includes an engine and a motor. The engine includes a crankshaft and a crankcase, the crankshaft is mounted in the crankcase, the crankcase includes a motor mounting cap, and a first end of the crankshaft extends out of the motor mounting cap. The motor includes a motor housing, a cap of the motor, a stator, and a rotor. The motor housing is mounted between the motor mounting cap and the cap of the motor, the stator is fixed in the motor housing, the rotor is arranged on the inner circumference of the stator and is rotatable relative to the stator, and the rotor is connected to the first end of the crankshaft.

20 Claims, 8 Drawing Sheets

(56) References Cited

U.S. PATENT DOCUMENTS

| | | | |
|---|---|---|---|
| 2009/0166108 A1 | 7/2009 | Gross et al. | |
| 2017/0088213 A1* | 3/2017 | Hanawa | B60K 6/405 |
| 2017/0355259 A1* | 12/2017 | Borud | B60K 6/26 |
| 2018/0015817 A1* | 1/2018 | Samie | B60K 6/387 |
| 2018/0099657 A1 | 4/2018 | Leiber et al. | |
| 2020/0108709 A1* | 4/2020 | Kohler | B60K 6/543 |
| 2021/0094406 A1* | 4/2021 | Payne | B60K 7/0007 |
| 2022/0080822 A1* | 3/2022 | Dong | F16H 9/26 |

FOREIGN PATENT DOCUMENTS

| | | |
|---|---|---|
| CN | 211519234 U | 9/2020 |
| CN | 211543245 U | 9/2020 |

\* cited by examiner

ALL-TERRAIN VEHICLE AND HYBRID POWER ASSEMBLY THEREOF

CROSS-REFERENCE TO RELATED APPLICATIONS

This application is a continuation of international application No. PCT/CN2020/126604, filed on Nov. 4, 2020, which claims priority to Chinese Patent Application 201911067893.0, entitled "ALL-TERRAIN VEHICLE AND HYBRID POWER ASSEMBLY THEREOF", filed on Nov. 4, 2019, both of which are hereby incorporated by reference in their entireties.

TECHNICAL FIELD

The present disclosure relates to the technical field of all-terrain vehicles, and in particular, to an all-terrain vehicle and a hybrid power assembly thereof.

BACKGROUND

In related technologies, an all-terrain vehicle is usually driven by a single power source, and the single power source is usually a fuel engine or a power motor. If the power source is a fuel engine, the all-terrain vehicle generally suffers from insufficient power under low engine speed conditions. Meanwhile, because the engine has to work under all working conditions, the combustion of mixed gas is insufficient during low-speed variable working conditions, which will result in low thermal efficiency, high fuel consumption, and high content of harmful gases in exhaust. If the power source is a power motor, the all-terrain vehicle has the advantages of no exhaust emissions during driving, low noise and simple structure, but at the same time has the disadvantages of short endurance mileage, high battery cost, long charging time, short battery life and high maintenance cost.

SUMMARY

The present disclosure aims to resolve at least one of the technical problems existing in the prior art. Therefore, an objective of the present disclosure is to provide a hybrid power assembly for an all-terrain vehicle, which can improve the power performance of the all-terrain vehicle and reduce exhaust emissions.

The present disclosure further proposes an all-terrain vehicle.

A hybrid power assembly for an all-terrain vehicle according to the present disclosure includes: an engine, the engine including a crankshaft and a crankcase, the crankshaft being mounted in the crankcase, the crankcase including a motor mounting cap, and a first end of the crankshaft extending out of the motor mounting cap and a motor, the motor including a motor housing, a cap of the motor, a stator and a rotor, the motor housing being mounted between the motor mounting cap and the cap of the motor, the stator being fixed in the motor housing, the rotor being arranged on the inner circumference of the stator and being rotatable relative to the stator, and the rotor being connected to the first end of the crankshaft.

Therefore, the hybrid power assembly including the engine and the motor can improve the power performance of the all-terrain vehicle, and an appropriate power source can be selected according to the working conditions and road conditions, thereby reducing energy consumption, saving energy, and reducing emissions of harmful gases. In addition, a battery that supplies power to the motor does not need to be continuously discharged for a long time, which can prolong the life of the battery.

In some examples of the present disclosure, an accommodating groove open toward the stator is formed in the motor mounting cap, the motor housing is provided with an accommodating hole, the accommodating hole is in communication and correspondence with the accommodating groove, a first part of the stator is accommodated in the accommodating groove and a second part is accommodated in the accommodating hole.

In some examples of the present disclosure, the peripheral surface of the stator is in interference fit with the accommodating hole.

In some examples of the present disclosure, the peripheral surface of the stator is provided with a convex ring protruding outward, the axial dimension of the convex ring is smaller than that of the accommodating hole, and the peripheral surface of the convex ring is in interference fit with the accommodating hole.

In some examples of the present disclosure, the motor further includes an terminal outlet and a cover of an outlet box, the outlet end is connected to the stator, the cover of the outlet box is arranged on the side of the cap of the motor away from the motor housing, the cap of the motor is provided with a through hole, an accommodating space for the terminal outlet is defined between the cap of the motor and the cover of an outlet box, and the terminal outlet extends out of the cap of the motor and is accommodated in the accommodating space.

In some examples of the present disclosure, the motor further includes: a sealing gasket, which is arranged at a joint surface of the cap of the motor and the cover of an outlet box.

In some examples of the present disclosure, the cap of the motor is provided with a first bearing hole, and the rotor is provided with a first rotor bearing fitted in the first bearing hole.

In some examples of the present disclosure, the motor mounting cap is detachably mounted on the crankcase, the motor housing is detachably mounted on the motor mounting cap, the cap of the motor is detachably mounted on the motor housing, and the cover of an outlet box is detachably mounted on the cap of the motor.

In some examples of the present disclosure, the motor includes a motor shaft, the rotor is fixed on the motor shaft, and the first end of the crankshaft is splined to a end of the motor shaft.

In some examples of the present disclosure, the first end of the crankshaft is provided with external splines, the end of the motor shaft is provided with internal splines and a second rotor bearing, the motor mounting cap is provided with a second bearing hole, the internal splines are matched with the external splines, and the second bearing hole is matched with the second rotor bearing.

In some examples of the present disclosure, the motor further includes: an airbag, which is connected to the cap of the motor and communicated with the internal space of the motor housing.

In some examples of the present disclosure, the cap of the motor is provided with an air hole, a connecting pipe is connected between the air hole and the airbag, the connecting pipe is bent toward the upper part of the crankcase, and the airbag is arranged at the upper part of the crankcase.

In some examples of the present disclosure, the hybrid power assembly further includes a continuously variable transmission, the continuously variable transmission is arranged on the crankcase, a second end of the crankshaft extends out of the crankcase, and the second end of the crankshaft is connected to an input portion of the continuously variable transmission.

In some examples of the present disclosure, the hybrid power assembly further includes a speed-shift actuator for providing relatively high and low transmission speed ratios. The speed-shift actuator for providing the relatively high and low transmission speed ratios is arranged in the crankcase and spaced apart from the crankshaft. The speed-shift actuator for providing the relatively high and low transmission speed ratios includes an input shaft, an output shaft, and a transmission gear set arranged between the input shaft and the output shaft. The input shaft is connected to an output portion of the continuously variable transmission The all-terrain vehicle according to the present disclosure includes the hybrid power assembly for the all-terrain vehicle.

Additional aspects and advantages of the present disclosure will be set forth, in part, from the following description, and in part will become apparent from the following description, or may be learned by practice of the present disclosure.

BRIEF DESCRIPTION OF THE DRAWINGS

The above and/or additional aspects and advantages of the present disclosure will become apparent and readily understood from the following description of embodiments taken in conjunction with the accompanying drawings.

Figure 1:
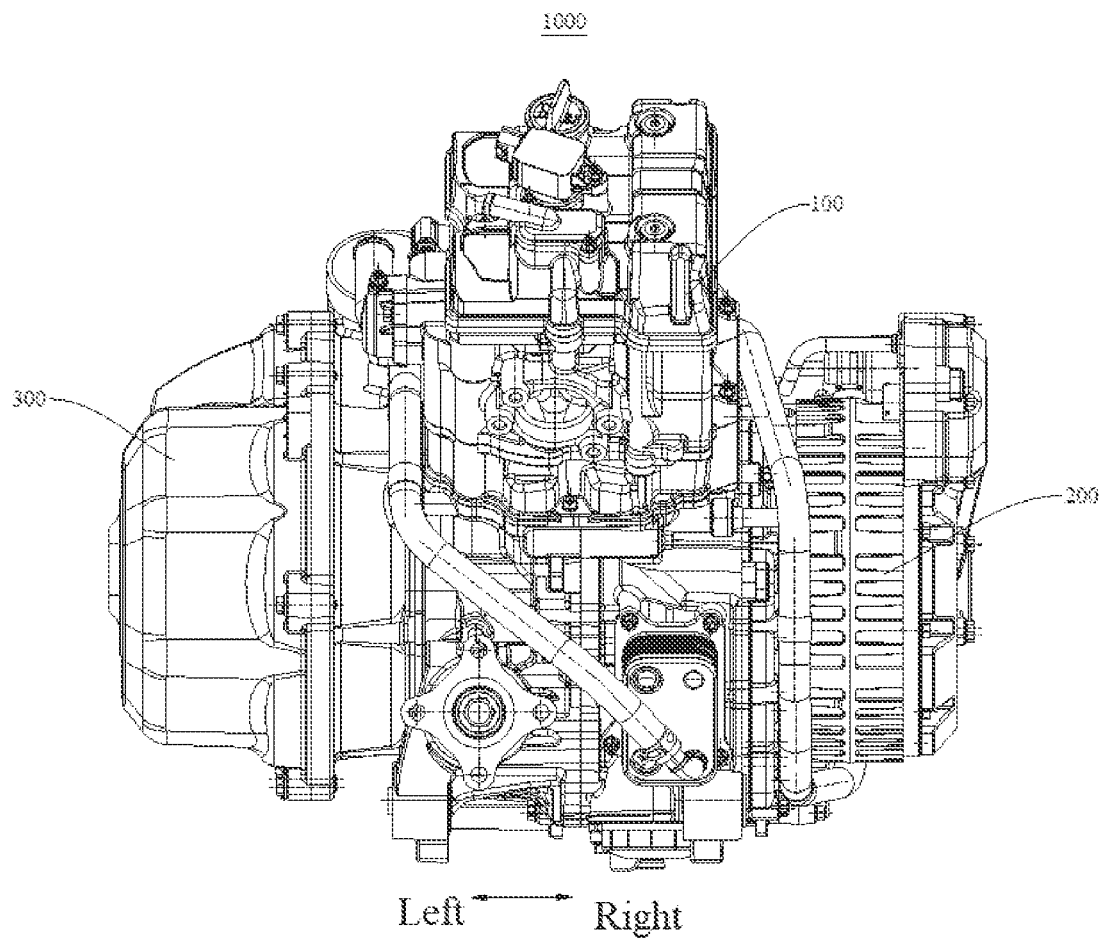
FIG. 1 is a schematic diagram of a hybrid power assembly according to an embodiment of the present disclosure.

REFERENCE NUMERALS hybrid power assembly 1000;
engine 100 crankshaft 10; external spline 11; crankcase 20;
motor mounting cap 30; accommodating groove 31; second bearing hole 32;
first side case 40; first bearing 41; second oil groove 411; third oil hole 412;
second side case 50; second bearing 51; first oil hole 511; first oil groove 512; second oil hole 513;
first mounting hole 52; first oil inlet hole 521; oil injection hole 522;
first case cover 60; third bearing 61;
piston 70;
motor 200; motor housing 210; accommodating hole 211; cap of the motor 220; through hole 221; first hearing hole 222; air hole 223;
stator 230; convex ring 231; rotor 240; first rotor bearing 241; second rotor bearing 242;
terminal outlet 250; cover of the outlet box 260; sealing gasket 270; airbag 280;
connecting pipe 281; motor shaft 290;

continuously variable transmission 300; and speed-shift actuator for providing relatively high and low transmission speed ratios 400.

DETAILED DESCRIPTION

The embodiments of the present disclosure are described in detail below. The embodiments described with reference to the accompanying drawings are exemplary, and the embodiments of the present disclosure are described in detail below.

The following describes a hybrid power assembly 1000 according to an embodiment of the present disclosure with reference to FIG. 1 to FIG. 10. The hybrid power assembly 1000 is applied in an all-terrain vehicle. Specifically, the all-terrain vehicle further includes a frame, the frame includes a cockpit and a power compartment, and the hybrid power assembly 1000 is arranged in the power compartment of the frame.

Figure 2:
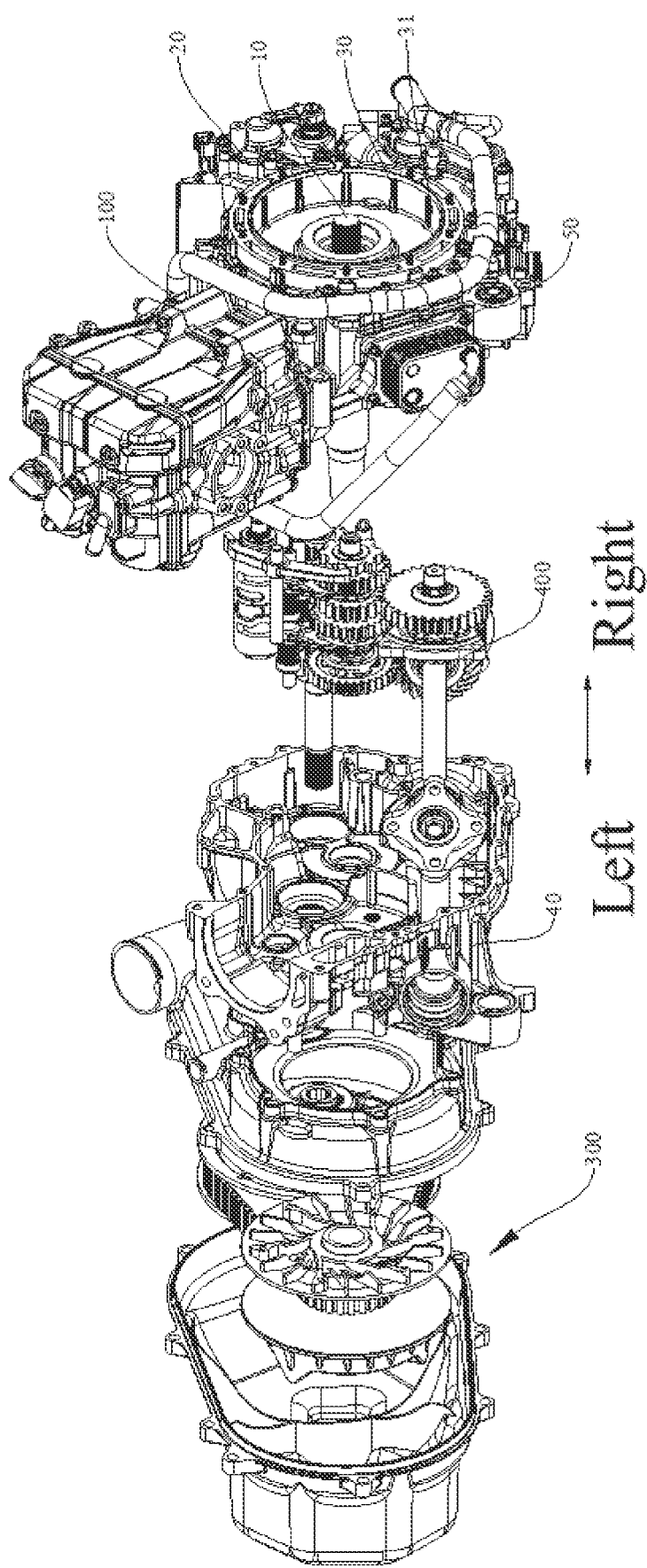
FIG. 2 is an exploded view of an engine and a continuously variable transmission.

As shown in FIG. 1 and FIG. 2, a hybrid power assembly 1000 according to an embodiment of the present disclosure may include an engine 100 and a motor 200. The motor 200 is arranged on one axial side of the engine 100. The axial direction is the left-right direction shown in FIG. 1. The motor 200 may be arranged on the right side of the engine 100, a transmission may be correspondingly arranged on the left side, and the transmission may be a continuously variable transmission 300.

The traditional all-terrain vehicle is a pure fuel vehicle, while the all-terrain vehicle of the present disclosure is a hybrid vehicle. The hybrid vehicle may select an appropriate power mode according to actual needs. For example, when the road conditions are good, the driver may select the engine 100 or the motor 200 as the power source, and when the road conditions are poor and the power of the engine 100 is insufficient, the driver may select the engine 100 and the motor 200 as the power source at the same time, which can effectively improve the power performance of the all-terrain vehicle, thereby effectively improving an effective guarantee for poor road conditions. When the power of a battery is little, the driver may select the engine 100 as the power source, and when the fuel is little, the driver may select the motor 200 as the power source. The motor 200 may also play a role in recovering energy. For example, when the all-terrain vehicle is in a parking state, the power generated by the engine 100 may be recovered by the motor 200, that is, the motor 200 may used not only as an electric motor, but also as a generator.

Therefore, the hybrid power assembly 1000 composed of the engine 100 and the motor 200 can improve the power performance of the all-terrain vehicle, and an appropriate power source can be selected according to the working conditions and road conditions, thereby reducing energy consumption, saving energy, and reducing emissions of harmful gases. In addition, the battery that supplies power to the motor 200 does not need to be continuously discharged for a long time, which can prolong the life of the battery.

Figure 3:
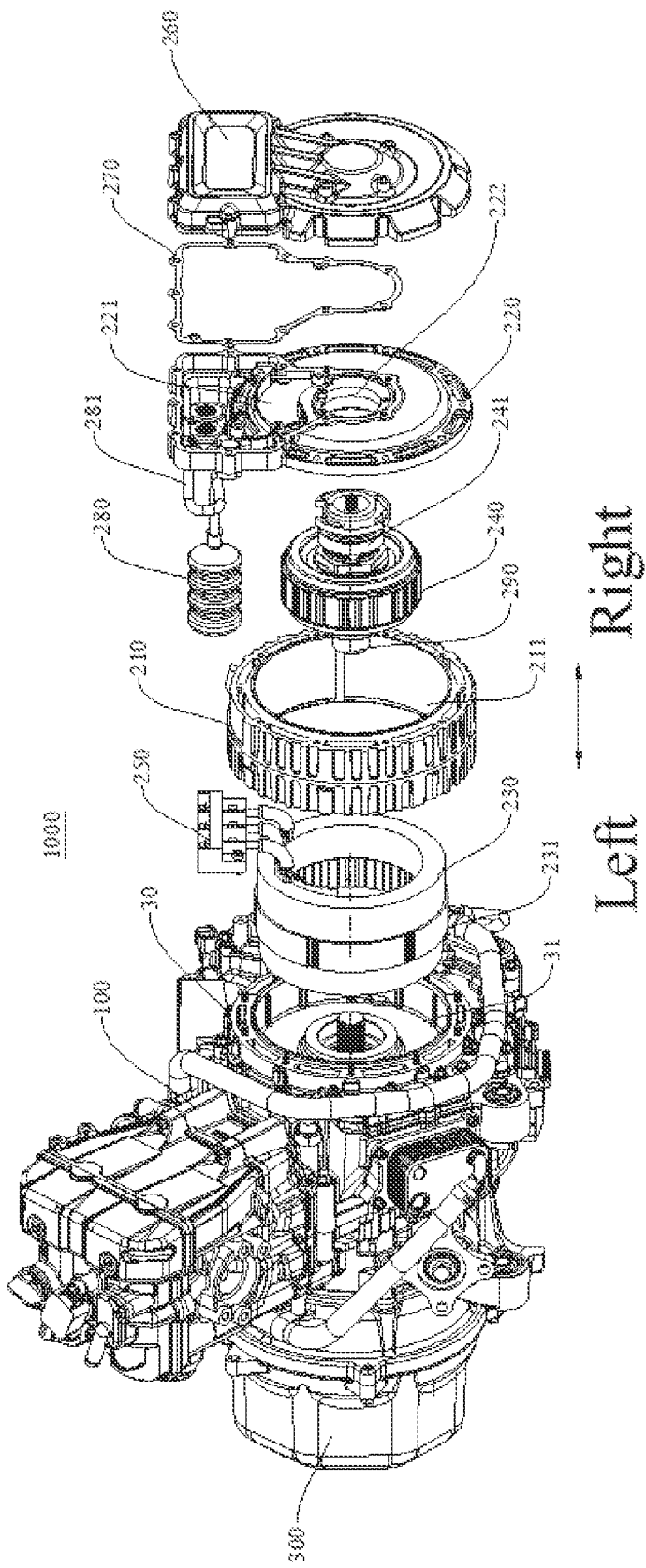
FIG. 3 is an exploded view of the hybrid power assembly shown in FIG. 1 at a motor.

As shown in FIG. 2 and FIG. 3, the engine 100 includes a crankshaft 10 and a crankcase 20, the crankshaft 10 is mounted in the crankcase 20, the crankcase 20 includes a motor mounting cap 30, and a first end (i.e., a right end) of the crankshaft 10 extends out of the motor mounting cap 30. The engine 100 of the present disclosure is provided with, on one side of the crankcase 20, the motor mounting cap 30 for mounting the motor 200, so that the motor 200 can be integrated on one side of the engine 100, which can improve the integration of the hybrid power assembly 1000 and reduce the space occupation of the hybrid power assembly 1000.

As shown in FIG. 3, the motor 200 includes: a motor housing 210, a cap of the motor 220, a stator 230, a motor shaft 290 and a rotor 240. The motor housing 210 is mounted between the motor mounting cap 30 and the cap of the motor 220, the stator 230 is fixed in the motor housing 210, the rotor 240 is arranged on the inner circumference of the stator 230 and is rotatable relative to the stator 230, the rotor 240 is fixed on the motor shaft 290, and the motor shaft 290 is connected to the first end of the crankshaft 10, which can ensure that the rotor 240 rotates synchronously with the first end of the crankshaft 10. That is, the motor housing 210 can be fixed on the motor mounting cap 30, the cap of the motor 220 can be fixed on the motor housing 210, and the stator 230 is fixed in the motor housing 210. In this way, the main structure of the motor 200 can be fixed on one side of the crankcase 20 of the engine 100, so that the connection reliability of the engine 100 and the motor 200 can be ensured, and the mounting of the motor 200 is simple and reliable.

The rotor 240 is connected to the crankshaft 10 through the motor shaft 290 and rotates synchronously, so that when either the engine 100 or the motor 200 is used as the power source, power can be transmitted to wheels through a transmission system. In other words, the engine 100 and the motor 200 can share the transmission system, which can reduce the modification of the all-terrain vehicle and reduce the research and development cost of the all-terrain vehicle. It should be noted that when the engine 100 is working, the crankshaft 10 can drive the rotor 240 to rotate synchronously. At this time, part of the power of the engine 100 can be converted into electrical energy through the motor 200, the electrical energy can be transmitted to the battery, and the battery can store the electrical energy, which can reduce energy waste. When the motor 200 is working, the motor 200 can transmit power through the crankshaft 10.

According to an optional embodiment of the present disclosure, as shown in FIG. 2 and FIG. 3, an accommodating groove 31 open toward the stator 230 is formed in the motor mounting cap 30, the motor housing 210 is provided with an accommodating hole 211, the accommodating hole 211 is in communication and correspondence with the accommodating groove 31, a first part of the stator 230 is accommodated in the accommodating groove 31, and a second part of the stator 230 is accommodated in the accommodating hole 211. That is, the motor mounting cap 30 can not only be used for mounting the motor 200, but also can be used as a side cover of the motor 200, and a part of the stator 230 is also accommodated therein, which can effectively reduce the axial dimension of the hybrid power assembly 1000, facilitate the mounting and fixation of the stator 230, and reduce the axial dimension of the motor housing 210.

Optionally, the peripheral surface of the stator 230 is in interference fit with the accommodating hole 211. The interference fit can enable the stator 230 to be securely mounted in the accommodating hole 211, which can ensure the mounting reliability between the stator 230 and the motor housing 210, and the interference fit is simple and easy to implement.

Figure 4:
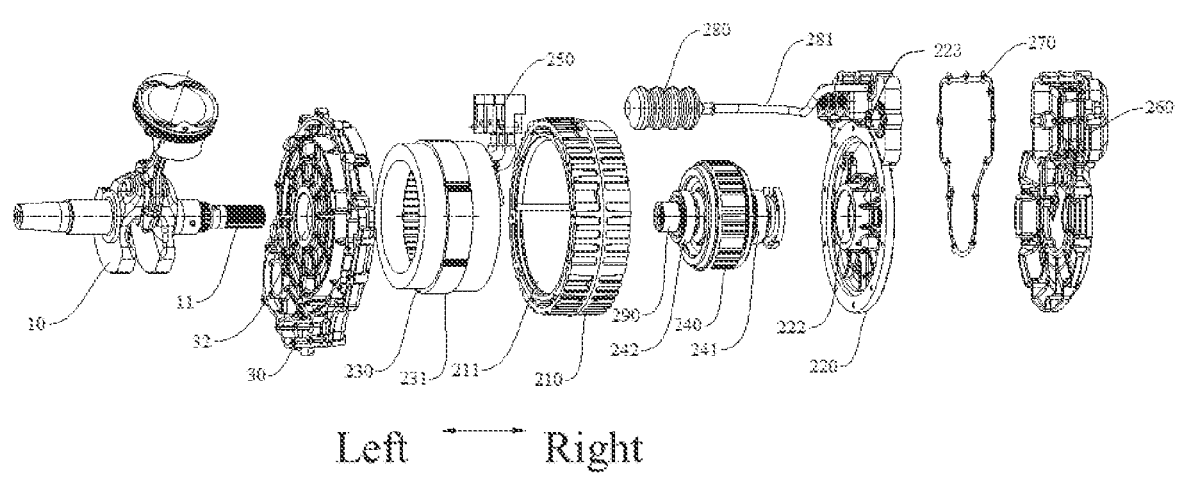
FIG. 4 is an exploded view of the motor.

Further, as shown in FIG. 3 and FIG. 4, the peripheral surface of the stator 230 is provided with a convex ring 231 protruding outward, the axial dimension of the convex ring 231 is smaller than that of the accommodating hole 211, and the peripheral surface of the convex ring 231 is in interference fit with the accommodating hole 211. That is, the stator 230 is matched with the motor housing 210 by means of the convex ring 231, which can simplify the structure of the stator 230, reduce the weight of the stator 230, and ensure the mounting reliability of the stator 230.

According to a specific embodiment of the present disclosure, as shown in FIG. 3 and FIG. 4, the motor 200 may further include an terminal outlet 250 and a cover of the outlet box 260, the terminal outlet 250 is connected to the stator 230, the cover of the outlet box 260 is arranged on the side of the cover of the motor 220 away from the motor housing 210, the cover of the motor 220 is provided with a through hole 221, an accommodating space for the terminal outlet 250 is defined between the cover of the motor 220 and the cover of the outlet box 260, and the terminal outlet 250 extends out of the cap of the motor 220 and is received in the accommodating space. A winding end of the stator 230 is connected to the terminal outlet 250, and the terminal outlet 250 is accommodated in the accommodating space, so that the cap of the motor 220 and the cover of the outlet box 260 can jointly protect the terminal outlet 250. The cover of the outlet box 260 also has the function of covering the motor 200, so as to ensure the structural sealing property of the motor 200.

Further, as shown in FIG. 3 and FIG. 4, the motor 200 may further include: a sealing gasket 270, which is arranged between the cap of the motor 220 and the cover of the outlet box 260. As shown in FIG. 4, the sealing gasket 270 is arranged at a joint surface of the cap of the motor 220 and the cover of the outlet box 260. The sealing gasket 270 can achieve a sealing effect, so as to better protect the terminal outlet 250 and the stator 230. Because the all-terrain vehicle may pass through some wading road conditions, the sealing gasket 270 can achieve a waterproof effect. The sealing gasket 270 may be a rubber gasket.

As shown in FIG. 3 and FIG. 4, the cap of the motor 220 is provided with a first bearing hole 222, the rotor 240 is provided with a first rotor bearing 241 fitted in the first bearing hole 222, and the sealing gasket 270 is arranged around the accommodating space and the first bearing hole 222. The size of the sealing gasket 270 should be suitable, so that the manufacturing difficulty of the sealing gasket 270 can be reduced, and the sealing gasket 270 can effectively seal the internal space of the motor 200.

As shown in FIG. 3 and FIG. 4, the motor mounting cap 30 is detachably mounted on the crankcase 20, the motor housing 210 is detachably mounted on the motor mounting cap 30, the cap of the motor 220 is detachably mounted on the motor housing 210, and the cover of the outlet box 260 is detachably mounted on the cap of the motor 220. That is, the motor 200 is integrally placed on one side of the crankcase 20, which can facilitate mounting and disassembly, facilitate subsequent maintenance and replacement of components, and reduce the maintenance cost of the hybrid power assembly 1000.

Optionally, the first end of the crankshaft 10 is splined to an end of the motor shaft 290. By means of spline fitting, the crankshaft 10 and the rotor 240 can move synchronously, and power can be smoothly transmitted between the two.

Specifically, as shown in FIG. 4, the first end of the crankshaft 10 is provided with external splines 11, the end of the motor shaft 290 is provided with internal splines and a second rotor bearing 242, the motor mounting cap 30 is provided with a second bearing hole 32, the internal splines are matched with the external splines 11, and the second bearing hole 32 is matched with the second rotor bearing 242. That is, the end of the motor shaft 290 is sleeved on the first end of the crankshaft 10, then the internal splines and the external splines 11 are matched with each other, and the rotor 240 is also fitted in the second bearing hole 32 through the second rotor bearing 242, which can ensure the support and transmission reliability of the end of the motor shaft 290 and the end of the crankshaft 10, and can improve the structural reliability of the hybrid power assembly 1000.

According to a specific embodiment of the present disclosure, as shown in FIG. 3 and FIG. 4, the motor 200 may further include an airbag 280, the airbag 280 is connected to the cap of the motor 220, and the airbag 280 is communicated with the internal space of the motor housing 210. The airbag 280 can expand and contract. When the temperature inside the motor 200 is high, part of air can enter the airbag 280. The airbag 280 can function to stabilize the working state of the motor 200, thereby ensuring the working stability of the motor 200 and improving the working performance of the motor 200.

The cap of the motor 220 is provided with an air hole 223, a connecting pipe 281 is connected between the air hole 223 and the airbag 280, the connecting pipe 281 is bent toward the upper part of the crankcase 20, and the airbag 280 is arranged at the upper part of the crankcase 20. The airbag 280 thus arranged can reasonably utilize the surrounding space of the crankcase 20, so that the hybrid power assembly 1000 occupies a small space and has a reasonable overall layout.

As shown in FIG. 1 and FIG. 2, the second end of the crankshaft 10 extends out of the left side of the crankcase 20, and the second end of the crankshaft 10 is connected to an input portion of the continuously variable transmission 300. The continuously variable transmission 300 thus arranged can reasonably utilize the space on the other side of the engine 100, which can improve the integration of the hybrid power assembly 1000.

Also, as shown in FIG. 2, the hybrid power assembly 1000 further includes a speed-shift actuator for providing relatively high and low transmission speed ratios 400, the speed-shift actuator for providing relatively high and low transmission speed ratios 400 is arranged in the crankcase 20 and spaced from the crankshaft 10, the speed-shift actuator for providing relatively high and low transmission speed ratios 400 includes an input shaft and an output shaft, a transmission gear set is arranged between the input shaft and the output shaft, and the input shaft is connected to an output portion of the continuously variable transmission 300. By arranging the speed-shift actuator for providing relatively high and low transmission speed ratios 400 in the crankcase 20, the internal space of the crankcase 20 can be reasonably utilized, and through the combination of the continuously variable transmission 300 and the speed-shift actuator for providing relatively high and low transmission speed ratios 400, the output power of the hybrid power assembly 1000 can have various options, which can improve the power output capability of the hybrid power assembly 1000.

The crankcase 20 of the engine 100 according to the embodiment of the present disclosure will be described in detail below with reference to the accompanying drawings.

As shown in FIG. 5 to FIG. 8, the crankcase 20 of the engine 100 according to the embodiment of the present disclosure may include a first side case 40, a second side case 50, a first case cover 60 and the above-mentioned motor mounting cap 30. The first side case 40 is provided with a first bearing 41, the second side case 50 is provided with a second bearing 51, the second side case 50 and the first side case 40 are axially opposite to each other, the first case cover 60 is arranged on the side of the first side case 40 away from the second side case 50, that is, the first case cover 60 is arranged on the left side of the first side case 40, and the second side case 50 is arranged on the right side of the first side case 40.

The first case cover 60 is provided with a third bearing 61, the third bearing 61 corresponds to the first bearing 41, and the motor mounting cap 30 is mounted on the side of the second side case 50 away from the first side case 40, that is, the motor mounting cap 30 is mounted on the right side of the second side case 50. Moreover, the motor mounting cap 30 is provided with a first through hole, the first through hole corresponds to the second bearing 51, and the first through hole is the above-mentioned second bearing hole 32.

That is, the crankcase 20 is mainly composed of the first side case 40, the second side case 50, the first case cover 60 and the motor mounting cap 30, where the first side case 40 and the second side case 50 confine an internal mounting space of the crankcase 20, and both the crankshaft 10 and the speed-shift actuator for providing relatively high and low transmission speed ratios 400 are arranged in the internal mounting space. The crankcase 20 thus arranged is structurally reliable and can facilitate the setting of multiple components.

The first end of the crankshaft 10 may pass through the second bearing 51 and the second bearing hole 32 correspondingly to be connected to the motor shaft 290, and the second end of the crankshaft 10 may pass through the first bearing 41 and the third bearing 61 correspondingly. The crankcase 20 thus arranged can effectively support the crankshaft 10, can ensure the mounting reliability of the crankshaft 10 in the crankcase 20, and thus can ensure the working reliability of the engine 100. The first end of the crankshaft 10 has a first sliding surface, the first sliding surface is fitted in the second bearing 51, the second end of the crankshaft 10 has a second sliding surface, and the second sliding surface is fitted in the first bearing 41 and the third bearing 61.

Optionally, the first bearing 41, the second bearing 51 and the third bearing 61 are all sliding bearings. The sliding bearings have the characteristics of stable, reliable and noiseless operation, and under the condition of liquid lubrication, the sliding surfaces are separated by lubricating oil without direct contact, which can greatly reduce friction loss and surface wear. In addition, oil films also have certain ability to absorb vibration. The integral sliding bearings can effectively support the crankshaft 10, and can reduce the mounting difficulty of the bearings.

According to a specific embodiment of the present disclosure, the first bearing 41, the second bearing 51 and the third bearing 61 are all provided with communicated oil grooves and oil holes, and the first side case 40, the second side case 50 and the first case cover 60 are all provided with oil passages communicated with the oil holes. That is, the oil passages can supply oil into the oil grooves through the oil holes, which can effectively lubricate the sliding surface of the crankshaft 10, reduce friction loss, and improve the smoothness of rotation of the crankshaft 10.

Figure 7:
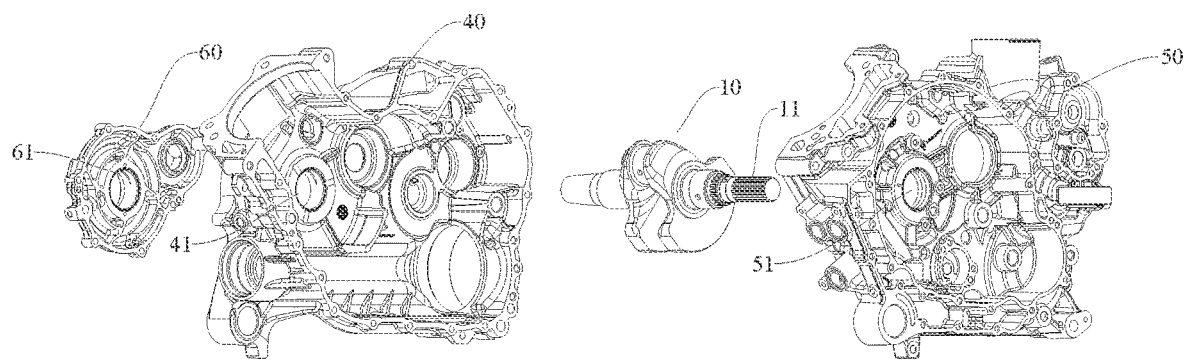
FIG. 7 is an exploded view of the crankcase.
Figure 8:
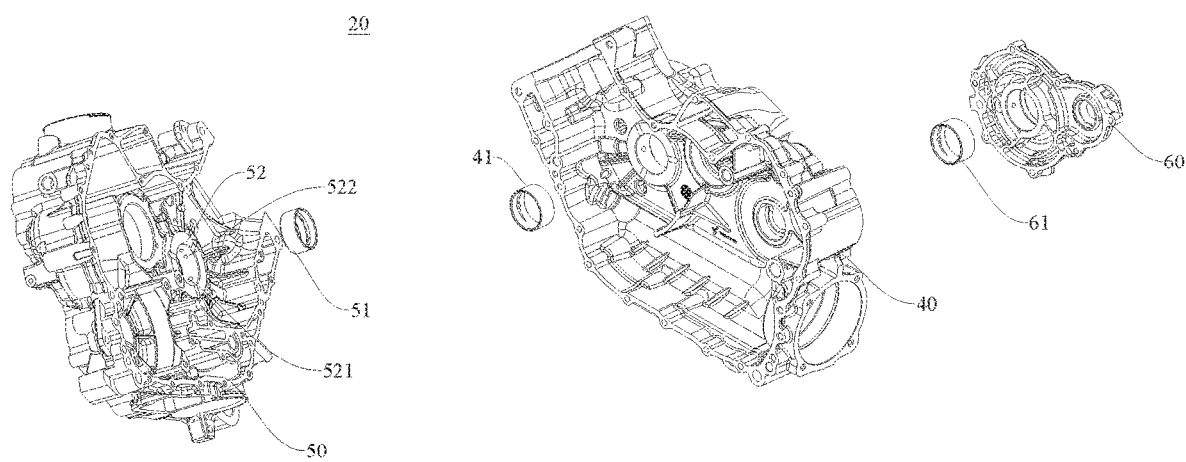
FIG. 8 is an exploded view of the crankcase.
Figure 9:
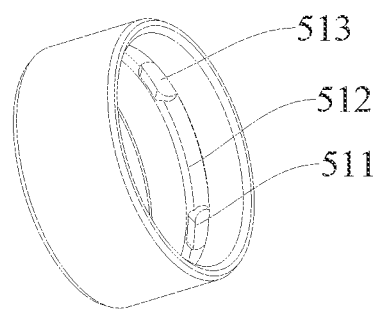
FIG. 9 is a schematic diagram of a second bearing.

Specifically, as shown in FIG. 7 to FIG. 9, the second side case 50 is provided with a first mounting hole 52 for mounting the second bearing 51, a first oil inlet hole 521 is formed on the inner circumference of the first mounting hole 52, the second bearing 51 is formed with a first oil hole 511 and a first oil groove 512 communicated with each other, the first oil hole 511 corresponds to the first oil inlet hole 521, and the first oil groove 512 is formed on the inner circumference surface of the first bearing 41. Lubricating oil can enter the first oil groove 512 from the first oil inlet hole 521 and the first oil hole 511, and the lubricating oil in the first oil groove 512 can effectively lubricate the first end of the crankshaft 10, so that the crankshaft 10 can rotate smoothly.

Figure 6:
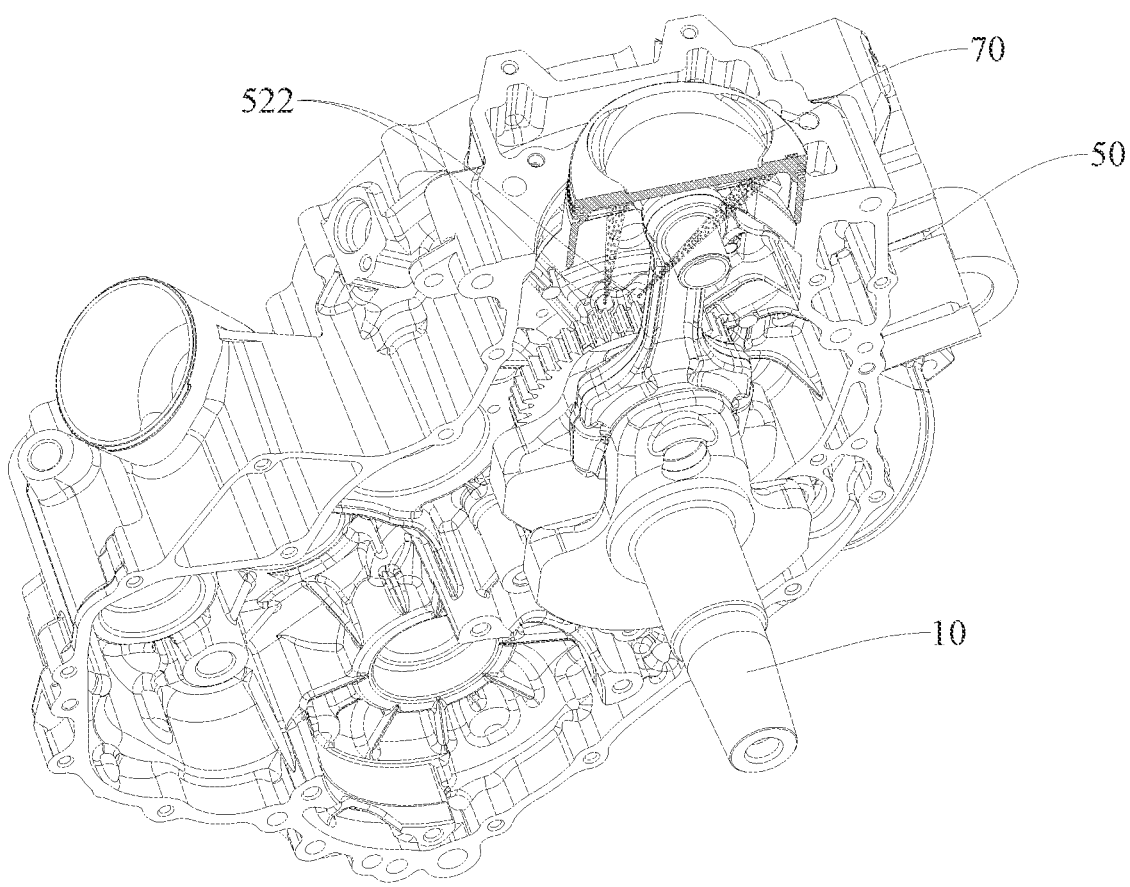
FIG. 6 is a schematic view of a second side case and a crankshaft.

Further, as shown in FIG. 6 and FIG. 8, at least one oil injection hole 522, for example, two oil injection holes 522, is provided at the first mounting hole 52, the second bearing 51 is provided with a second oil hole 513, the second oil hole 513 is communicated with the oil injection hole 522, and an exit end of the oil injection hole 522 faces the bottom of a piston 70 of the engine 100. The oil injection hole 522 may spray lubricating oil to the bottom of the piston 70 by means of oil pressure, so as to achieve the function of lubricating the piston 70, reduce the wear of the piston 70, prolong the service life of the piston 70, and improve the working reliability of the engine 100. The second oil hole 513 and the first oil hole 511 are arranged at intervals in the circumferential direction of the first bearing 41.

Figure 10:
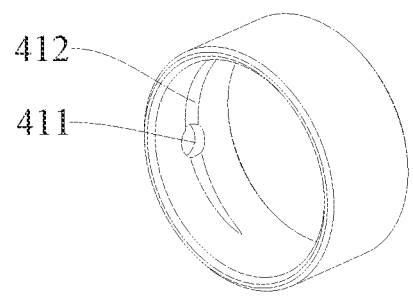
FIG. 10 is a schematic diagram of a first bearing.

Optionally, as shown in FIG. 10, the first bearing 41 is formed with a second oil groove 412 and a third oil hole 411, the third bearing 61 is formed with a third oil groove and a fourth oil hole, and the second oil groove 412 and the third oil groove are non-annular oil grooves. Thus, the first bearing 41 and the third bearing 61 can also achieve the function of lubricating the second end of the crankshaft 10, the non-annular oil grooves can make the pressure of oil films at the oil grooves uniform and the lubrication effect is good.

Figure 5:
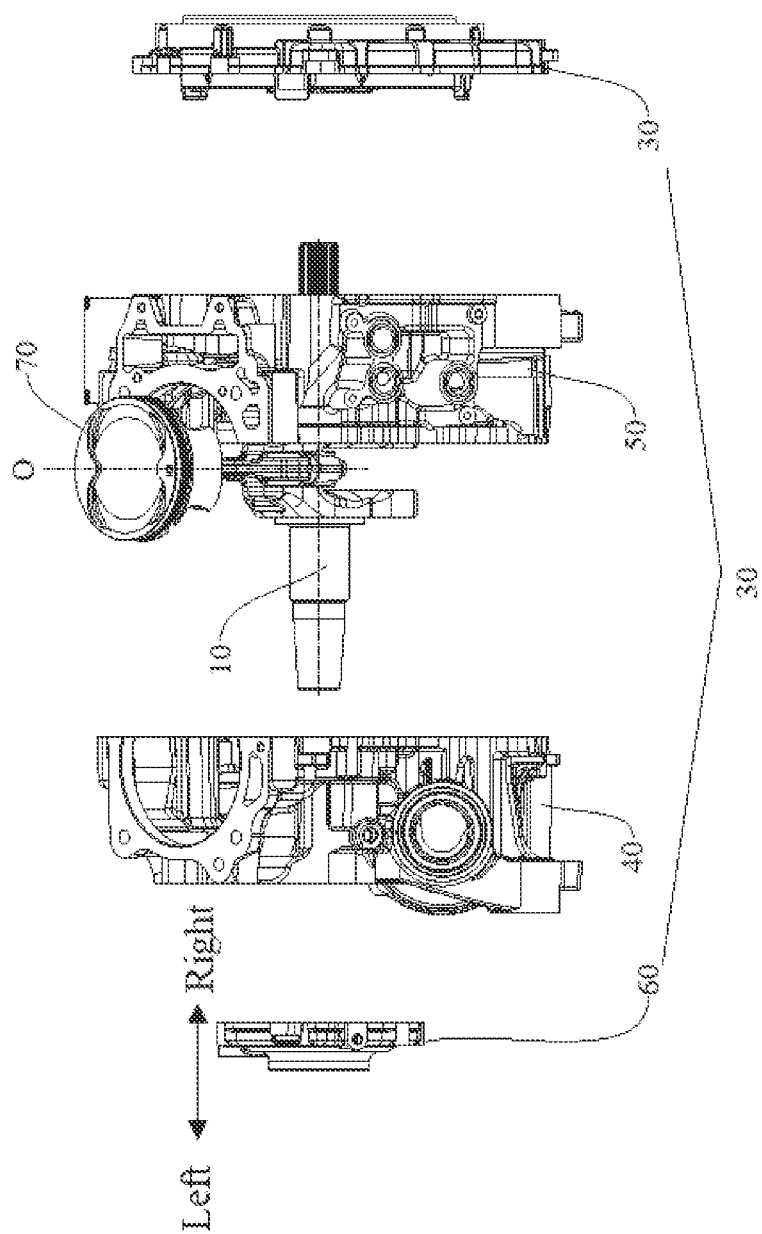
FIG. 5 is an exploded view of a crankcase of the engine.

Optionally, as shown in FIG. 5, the engine 100 has a cylinder, the cylinder has a center plane, the center plane is perpendicular to the axial direction of the crankcase 20, and the joint plane of the first side case 40 and the second side case 50 is non-coplanar with the center plane. By setting the joint plane of the first side case 40 and the second side case 50 to be non-coplanar with the center plane, the axial dimensions of the first side case 40 and the second side case 50 can be gradually approached, which can reduce the axial dimension difference between the two and reduce the difficulty of forming the first side case 40 and the second side case 50.

Specifically, the axial dimension of the first side case 40 and the axial dimension of the second side case 50 may be the same. Therefore, the first side case 40 and the second side case 50 can be manufactured by approximate molds, which can reduce the difficulty of manufacturing the first side case 40 and the second side case 50.

Reference throughout this specification to "an embodiment", "some embodiments", "an exemplary embodiment", "an example", "a specific example", or "some examples" means that a particular feature, structure, material, or characteristic described in connection with the embodiment or example is included in at least one embodiment or example of the present disclosure. Thus, the above terms throughout this specification are not necessarily referring to the same embodiment or example of the present invention.

Although the embodiments of the present disclosure are shown and described, it can be understood by those of ordinary skill in the art that various changes, modifications, substitutions, and alterations can be made in these embodiments without departing from the principles and spirit of the present disclosure. The scope of the present disclosure is defined by the claims and equivalents thereof.

What is claimed is:

1. A hybrid power assembly for an all-terrain vehicle, comprising:
   an engine, the engine comprising a crankshaft and a crankcase, the crankshaft being mounted in the crankcase, the crankcase comprising a motor mounting cap, and a first end of the crankshaft extending out of the motor mounting cap; and
   a motor, the motor comprising a motor housing, a cap of the motor, a stator and a rotor, the motor housing being mounted between the motor mounting cap and the cap of the motor, the stator being fixed in the motor housing, the rotor being arranged on the inner circumference of the stator and being rotatable relative to the stator, and the rotor being connected to the first end of the crankshaft,
   wherein the engine and the motor are both configured to be serve as a power source for the all-terrain vehicle.

2. The hybrid power assembly for the all-terrain vehicle according to claim 1, wherein an accommodating groove open toward the stator is provided in the motor mounting cap, the motor housing is provided with an accommodating hole, the accommodating hole is in communication and correspondence with the accommodating groove, a first part of the stator is accommodated in the accommodating groove and a second part of the stator is accommodated in the accommodating hole.

3. The hybrid power assembly for the all-terrain vehicle according to claim 2, wherein a peripheral surface of the stator is in interference fit with the accommodating hole.

4. The hybrid power assembly for the all-terrain vehicle according to claim 3, wherein the peripheral surface of the stator is provided with a convex ring protruding outward, an axial dimension of the convex ring is smaller than an axial dimension of the accommodating hole, and the peripheral surface of the convex ring is in interference fit with the accommodating hole.

5. The hybrid power assembly for the all-terrain vehicle according to claim 1, wherein the motor further comprises a terminal outlet and a cover of an outlet box, the terminal outlet is connected to the stator, the cover of the outlet box is arranged on the side of the cap of the motor away from the motor housing, the cap of the motor is provided with a through hole, an accommodating space for the terminal outlet is defined between the cap of the motor and the cover of the outlet box, and the terminal outlet extends out of the cap of the motor and is accommodated in the accommodating space.

6. The hybrid power assembly for the all-terrain vehicle according to claim 5, wherein the motor further comprises: a sealing gasket, which is arranged at a joint surface of the cap of the motor and the cover of the outlet box.

7. The hybrid power assembly for the all-terrain vehicle according to claim 5, wherein the cap of the motor is provided with a first bearing hole, and the rotor is provided with a first rotor bearing fitted in the first bearing hole.

8. The hybrid power assembly for the all-terrain vehicle according to claim 5, wherein the motor mounting cap is detachably mounted on the crankcase, the motor housing is detachably mounted on the motor mounting cap, the cap of the motor is detachably mounted on the motor housing, and the cover of the outlet box is detachably mounted on the cap of the motor.

9. The hybrid power assembly for the all-terrain vehicle according to claim 1, wherein the motor comprises a motor shaft, the rotor is fixed on the motor shaft, and the first end of the crankshaft is splined to an end of the motor shaft.

10. The hybrid power assembly for the all-terrain vehicle according to claim 9, wherein the first end of the crankshaft is provided with external splines, the end of the motor shaft is provided with internal splines and a second rotor bearing, the motor mounting cap is provided with a second bearing hole, the internal splines are matched with the external splines, and the second bearing hole is matched with the second rotor bearing.

11. The hybrid power assembly for the all-terrain vehicle according to claim 1, wherein the motor further comprises: an airbag that is connected to the cap of the motor and in communication with the internal space of the motor housing.

12. The hybrid power assembly for the all-terrain vehicle according to claim 11, wherein the cap of the motor is provided with an air hole, a connecting pipe is connected between the air hole and the airbag, the connecting pipe is bent toward the upper part of the crankcase, and the airbag is arranged at the upper part of the crankcase.

13. The hybrid power assembly for the all-terrain vehicle according to claim 1, further comprising: a continuously variable transmission, wherein the continuously variable transmission is arranged on the crankcase, a second end of the crankshaft extends out of the crankcase, and the second end of the crankshaft is connected to an input portion of the continuously variable transmission.

14. The hybrid power assembly for the all-terrain vehicle according to claim 13, further comprising: a speed-shift actuator for providing relatively high and low transmission speed ratios, wherein the speed-shift actuator for providing the relatively high and low transmission speed ratios is arranged in the crankcase and spaced apart from the crankshaft, the speed-shift actuator for providing the relatively high and low transmission speed ratios comprises an input shaft, an output shaft, and a transmission gear set arranged between the input shaft and the output shaft, and the input shaft is connected to an output portion of the continuously variable transmission.

15. An all-terrain vehicle, comprising a hybrid power assembly for an all-terrain vehicle, the hybrid power assembly comprising:
an engine, the engine comprising a crankshaft and a crankcase, the crankshaft being mounted in the crankcase, the crankcase comprising a motor mounting cap, and a first end of the crankshaft extending out of the motor mounting cap; and
a motor, the motor comprising a motor housing, a cap of the motor, a stator and a rotor, the motor housing being mounted between the motor mounting cap and the cap of the motor, the stator being fixed in the motor housing, the rotor being arranged on the inner circumference of the stator and being rotatable relative to the stator, and the rotor being connected to the first end of the crankshaft,
wherein the engine and the motor are both configured to be serve as a power source for the all-terrain vehicle.

16. The all-terrain vehicle according to claim 15, wherein an accommodating groove open toward the stator is provided in the motor mounting cap, the motor housing is provided with an accommodating hole, the accommodating hole is in communication and correspondence with the accommodating groove, a first part of the stator is accommodated in the accommodating groove and a second part of the stator is accommodated in the accommodating hole.

17. The all-terrain vehicle according to claim 16, a peripheral surface of the stator being provided with a convex ring protruding outward, wherein an axial dimension of the convex ring is smaller than an axial dimension of the accommodating hole, and the peripheral surface of the convex ring is in interference fit with the accommodating hole.

18. The all-terrain vehicle according to claim 16, the motor mounting cap is detachably mounted on the crankcase, the motor housing is detachably mounted on the motor mounting cap, the cap of the motor is detachably mounted on the motor housing.

19. The all-terrain vehicle according to claim 15, the motor further comprising an airbag that is connected to the cap of the motor and in communication with the internal space of the motor housing.

20. The all-terrain vehicle according to claim 19, the cap of the motor being provided with an air hole, a connecting pipe being connected between the air hole and the airbag, the connecting pipe being bent toward the upper part of the crankcase, and the airbag being arranged at the upper part of the crankcase.

* * * * *